(12) United States Patent
Brooks, Jr. et al.

(10) Patent No.: US 6,471,299 B2
(45) Date of Patent: Oct. 29, 2002

(54) MOORING DEVICE FOR MAINTAINING A DUMP BODY IN A RAISED POSITION

(75) Inventors: Thomas N. Brooks, Jr., Oakley, IL (US); O. Gordon Pence, East Peoria, IL (US); Joseph A. Rapp, Decatur, IL (US); Jon P. White, Monticello, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/784,433

(22) Filed: Feb. 15, 2001

(65) Prior Publication Data

US 2002/0109393 A1 Aug. 15, 2002

(51) Int. Cl.[7] .................................................. B60P 1/04
(52) U.S. Cl. .................................................. 298/17 B
(58) Field of Search ............................ 298/17 B, 17 R, 298/22 R; 248/499, 351

(56) References Cited

U.S. PATENT DOCUMENTS

| | | | |
|---|---|---|---|
| 1,392,615 A | | 10/1921 | Anthony |
| 1,523,525 A | | 1/1925 | Hatashita |
| 2,625,427 A | | 1/1953 | Rickel et al. |
| 2,732,253 A | | 1/1956 | Birdwell |
| 2,988,399 A | | 6/1961 | Wood |
| 3,173,644 A | * | 3/1965 | Burfiend .................. 298/17 B |
| 3,813,124 A | * | 5/1974 | Roland .................... 298/17 B |
| 3,955,851 A | | 5/1976 | Umeda et al. |
| 3,988,925 A | | 11/1976 | Seccombe et al. |
| 4,138,158 A | | 2/1979 | Jones |
| 4,218,094 A | | 8/1980 | Leaver |
| 4,243,267 A | | 1/1981 | Meyers |
| 4,305,619 A | | 12/1981 | Sas |
| 4,483,185 A | | 11/1984 | Kunzfeld |
| 4,521,863 A | | 6/1985 | Solaroli |
| 4,636,132 A | | 1/1987 | Menke et al. |
| 4,779,931 A | | 10/1988 | Miller et al. |
| 4,966,107 A | | 10/1990 | Imajo |
| 4,981,117 A | | 1/1991 | McRobert et al. |
| 5,003,940 A | | 4/1991 | Hixson |
| 5,174,632 A | | 12/1992 | Hagenbuch et al. |
| 5,267,780 A | * | 12/1993 | Friesen et al. ............ 298/17 B |
| 5,351,413 A | | 10/1994 | Bruner et al. |
| 5,405,181 A | | 4/1995 | Watkins et al. |

FOREIGN PATENT DOCUMENTS

| | | |
|---|---|---|
| DE | 30 02 015 | 7/1980 |
| EP | 0 407 302 | 1/1991 |
| GB | 423313 | 7/1980 |
| JP | 55-87629 | 7/1980 |
| JP | 56077505 | 6/1981 |
| JP | 58-101833 | 6/1983 |
| JP | 59007716 | 1/1984 |
| JP | 60027707 | 2/1985 |
| JP | 60069223 | 4/1985 |

OTHER PUBLICATIONS

Disassembly and Assembly 797 Off–Highway Truck Power Train, Truck Body Retaining Cable—Remove and Install, Publication Date Jan. 1, 2001; 5 pages.

* cited by examiner

*Primary Examiner*—Stephen T. Gordon
(74) *Attorney, Agent, or Firm*—O Gordon Pence; Thomas L Derry (57) ABSTRACT

A dump truck is provided with a mooring device for maintaining a dump body of the truck in a raised position when the truck is being serviced. The mooring device utilizes two tension members or cables and includes a load distribution mechanism so as to prevent one of the tension members from carrying a substantially greater tensile load than the other member.

14 Claims, 6 Drawing Sheets

Fig_1_

Fig_6_

MOORING DEVICE FOR MAINTAINING A DUMP BODY IN A RAISED POSITION

TECHNICAL FIELD

The present invention relates to a mooring device for holding up a dump body of a truck in a raised position for truck maintenance purposes and the like.

BACKGROUND ART

When making repairs, performing routine service or maintenance or doing other work on a dump truck, it is frequently desirable to put the dump body in a raised position in order to make access to certain components located beneath the dump body easier. Various techniques have been employed in the past for holding a dump body of a truck in its raised position when repairs or routine maintenance are being performed on the truck. One technique employed in the past is disclosed in U.S. Pat. No. 3,955,851 for a "Stopper Device for Use in Dump Truck's Vessel," issued May 11, 1976 to Haruhiko Umeda et.al. that comprises a wire rope connected to the rear end portion of the dump body and the rear axle housing of the truck.

One problem with prior devices, such as the preceding, is that as trucks became larger, particularly the very large off-highway trucks employed at mines, the dump bodies became heavier and the hydraulic down force exerted by the dump body hoist system has increased. To accommodate the increase in weight or in hydraulic down force, larger diameter steel cable had to be used. However, large steel cable is very stiff and it can become impractical for one person to manipulate and hook up if the cable becomes twisted or bent to any degree.

The use of multiple cables can reduce this effort because each cable is smaller and more flexible, thereby making it possible for one person to hook the cables up. However, if the truck is setting on uneven ground or the truck body itself becomes twisted, the load exerted by the body when being held in its raised position may be exerted wholly on one of the cables because such prior devices could not accommodate the magnitude of the dimensional variations that can occur. This could cause this single load bearing cable to be overloaded and break.

The present invention is directed to overcoming one or more of the problems encountered in the use of prior art devices for maintaining a dump body of a truck in a raised position.

DISCLOSURE OF THE INVENTION

In accordance with one aspect of the present invention, a mooring device is provided for maintaining a dump body of a truck in a raised position. The truck has a chassis with the dump body pivotally mounted on the chassis about a transverse pivot axis for movement between a lowered position and a raised position. The mooring device includes a pair of laterally spaced apart and generally parallel tension members. Each tension member is attached between one of a first set of mooring points on the chassis and one of a second set of mooring points on the dump body. Each tension member is also capable of carrying a high tensile load sufficient to maintain the dump body in its raised position. The mooring device also includes a load distribution mechanism that contains one of the first and second sets of mooring points. The load distribution mechanism is constructed with a capacity to accommodate a sufficient amount of dimensional variation to ensure that the tension members are equally loaded when said mooring device is being employed so as to prevent one of the tension members from carrying a substantially greater tensile load than the other tension member.

BEST MODE FOR CARRYING OUT THE INVENTION

Figure 1:
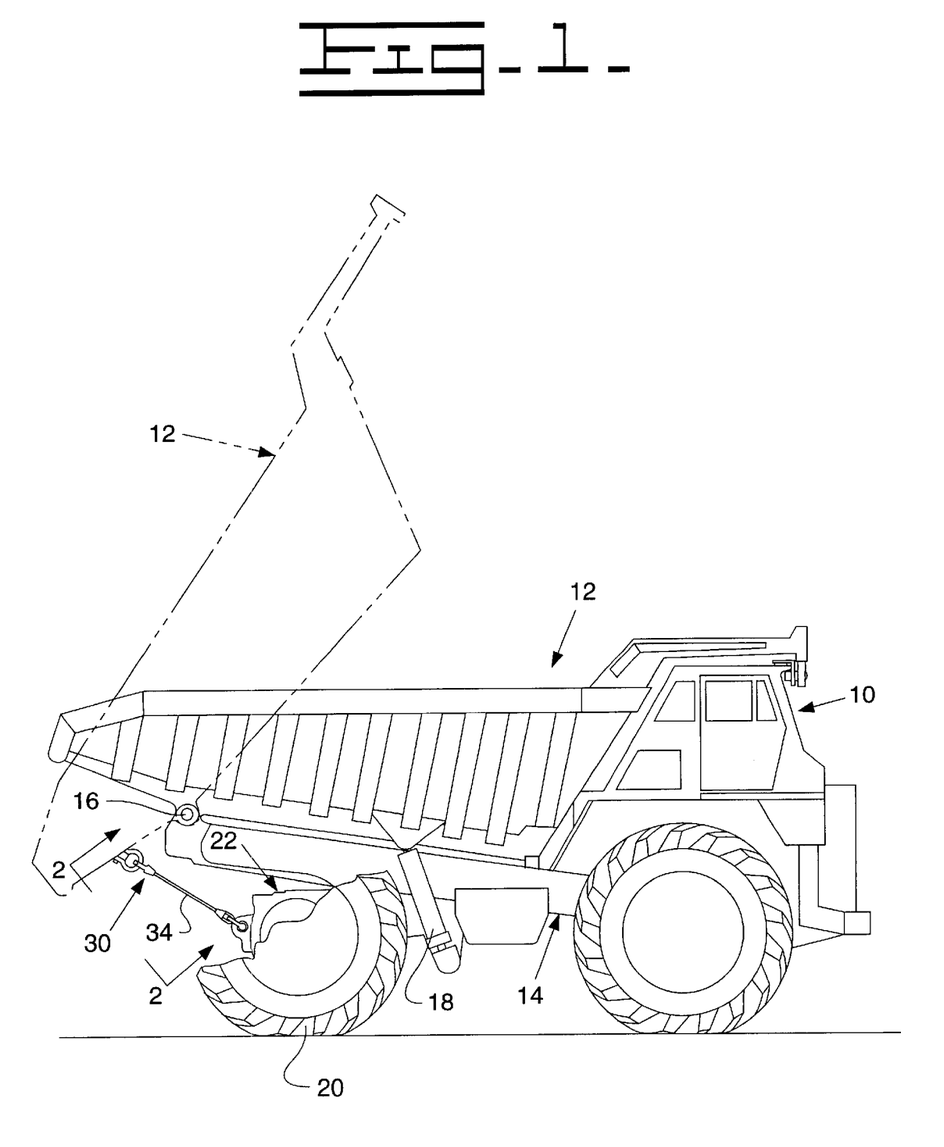
FIG. 1 is a side elevational view of a dump truck and illustrating one embodiment of a mooring device embodying the principals of the present invention.

Referring more particularly to the drawings, a dump truck, such as a large off-highway ore hauling truck, is depicted at 10 in FIG. 1. The dump truck has a dump body 12 pivotally mounted to the rear portion of a chassis 14 about a laterally extending pivot axis 16. A pair of hydraulic lift or hoist cylinders, one shown at 18, may be employed for raising and lowering the dump body 12 about the pivot axis 16 between a lowered position (shown in solid lines in FIG. 1) and a raised position (shown in dotted lines in FIG. 1). The rear end of the chassis is supported by left and right hand sets of dual tires 20, which are operatively connected to a drive axle and differential 22 that are contained within an axle housing 24. Large off-highway trucks of the type depicted in FIG. 1 are of a size so as to carry many tons of material. Currently, one of the largest of such off-highway trucks has a rated haul capacity of 360 tons.

In accordance with the present invention, a mooring device 30 is provided for maintaining the dump body 12 of the truck 10 in its raised position, as depicted in dotted lines in FIG. 1. The mooring device 30 includes a load distribution mechanism 36 and a pair of laterally spaced apart and generally parallel tension members, one of such tension members being a first or left-hand tension member 32 and the other of such tension members being a second or right-hand tension member 34. Each tension member 32,34 is capable of carrying a high tensile load and together are sufficient to hold the dump body in its raised position. The tension members 32,34 are preferably constructed from steel wire cable. However, steel chain, steel rods or strapping of Kevlar® or other suitable material may be used in place of the steel cable and their use is contemplated and within the scope of the present invention. The steel cable is selected by its tensile rating in connection with the particular weight of the dump body and the down force produced by the hoist cylinders that the cables are intended to restrain. For the 360 ton haul weight truck mentioned above, a 34.92 mm (1.38") diameter plow steel wire rope (6×19 I.W.R.C.) having a tensile capacity of 854 kN (96 tons) has been employed for tension members 32,34.

The load distribution mechanism 36 is coupled to each of the first and second tension members 32,34 in a manner hereinafter described. The load distribution mechanism 36 is constructed to accommodate unequal variations either in the lengths of the tension members 32,34 or in the distances between the anchor points of such tension members in order to ensure that equal tensile loads are carried by each of the first and second members 32,34 when the mooring device is being employed so as to prevent one of the tension members 32,34 from carrying a substantially greater tensile load than the other member. In particular, the load distribution mechanism 36 is constructed so as to accommodate a variation of at least 25.4 mm (1 inch), and preferably, a variation of about 76 mm (3 inches) between the lengths of the tension members 32,34 or in the distances between their anchor points. Such variations may occur due to an unequal stretching of the tension members 32,34 or the axle not being level because of the truck 10 setting on uneven ground, or by the dump body 12 becoming twisted during use or the like.

Figure 2:
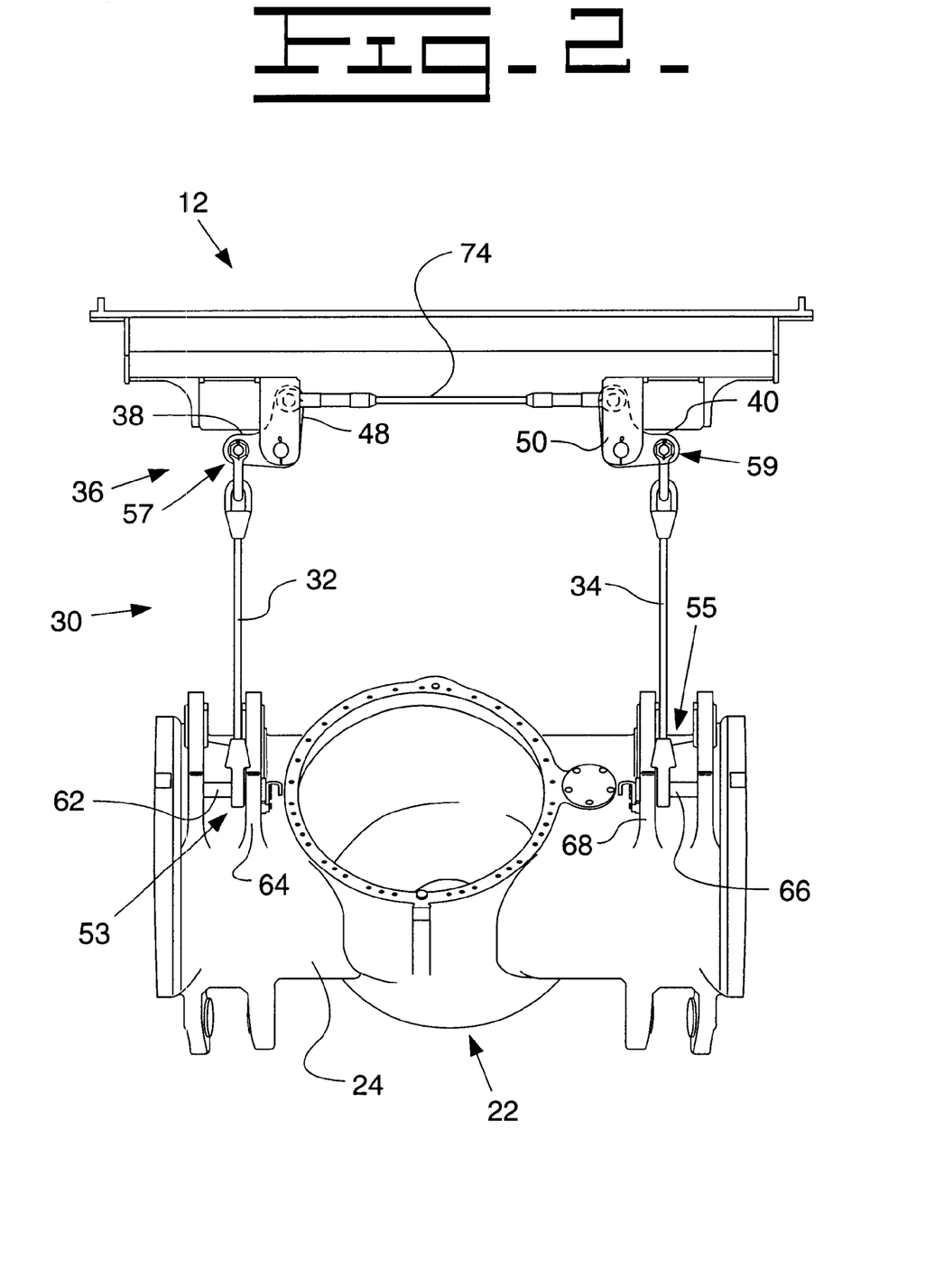
FIG. 2 is a fragmentary, generally end view taken along line 2—2 of FIG. 1 of the mooring device and illustrating its connection to the dump body and axle of the truck.
Figure 3:
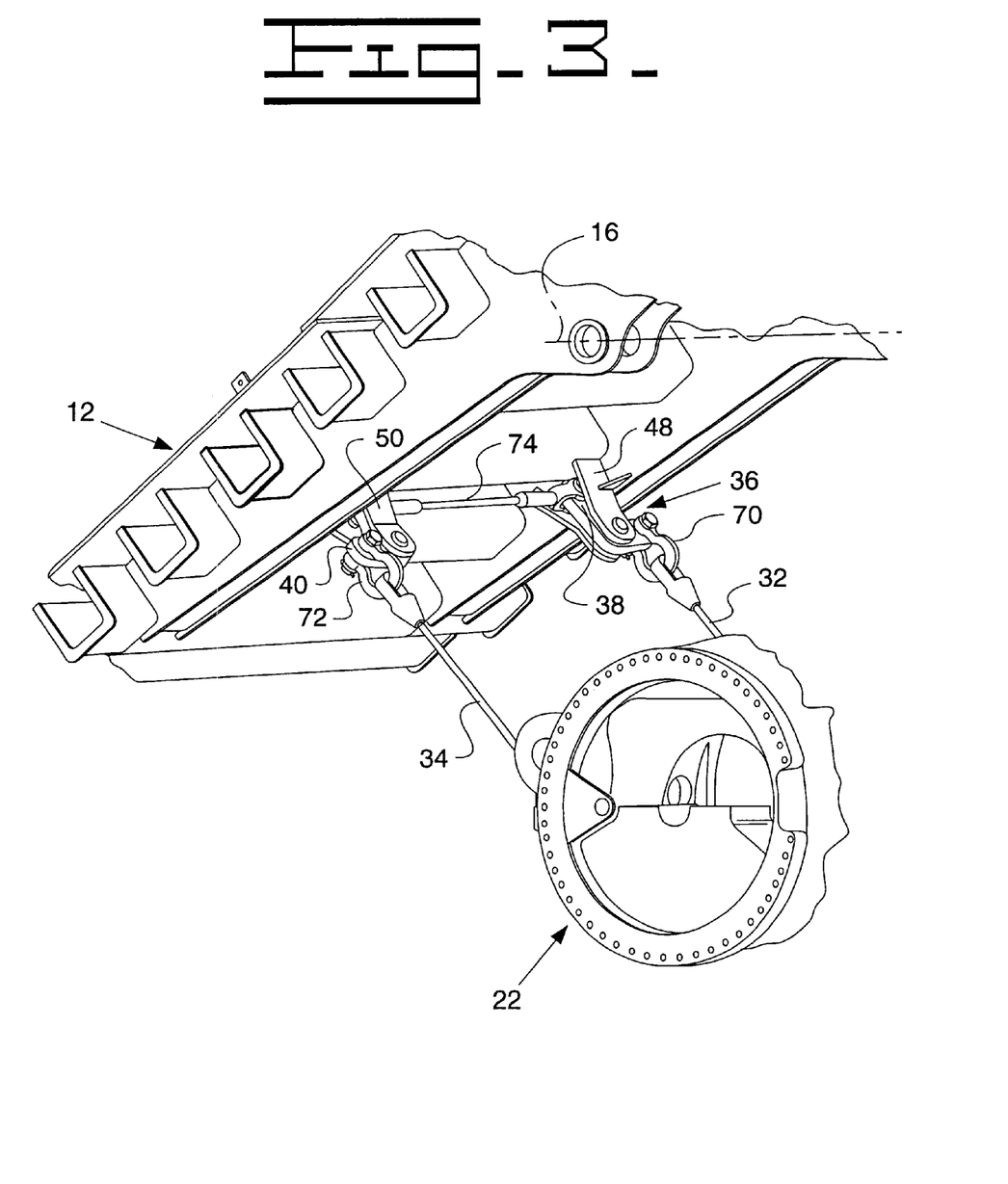
FIG. 3 is a fragmentary perspective view of the mooring device and its connection to the dump body of the truck.
Figure 4:
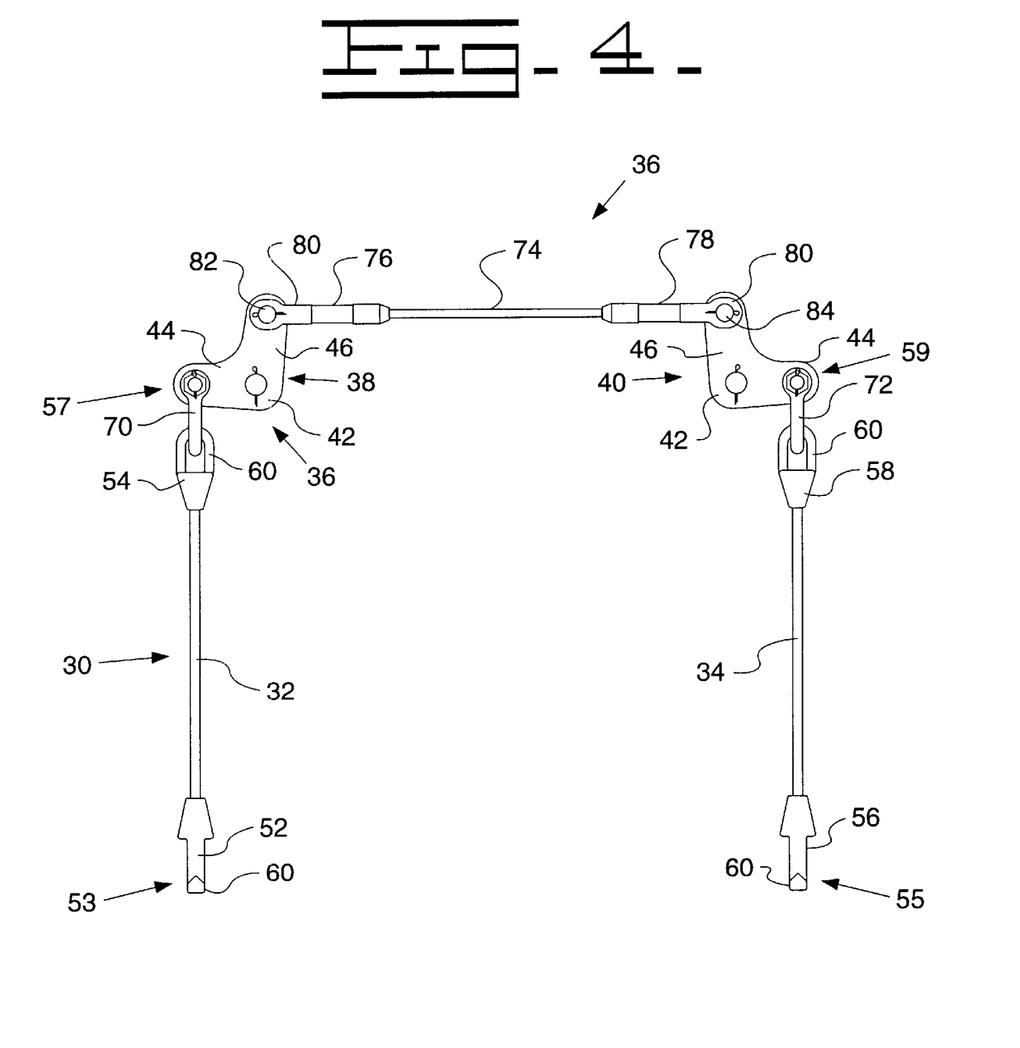
FIG. 4 is an elevational view similar to FIG. 2, but only of the mooring device by itself.

In one embodiment of the present invention, the load distribution mechanism 36 includes a first bell crank 38 and a second bell crank 40. As best show in FIG. 4, each bell crank 38,40 has an apex 42, a generally laterally outwardly extending arm 44 and a generally upwardly extending arm 46. The load distribution mechanism 36 also includes a pair of brackets 48,50 (FIG. 2) affixed to the underside of the dump body 12 for pivotally mounting the bell cranks 38,40 at their apexes 42 parallel at transversely spaced apart right- and left-hand locations about parallel pivot axes spaced to the rear of the pivot axis 16 of the dump body 12. Each tension member 32,34 has two opposite free ends 52,54 and 56,58, respectively. Each end of such opposite free ends of each tension member or cable 32,34 is preferably provided with a closed loop socket 60. The first free end 52 of the first cable 32 may be selectively manually anchored to the chassis 14 at a lower left-hand anchor point location 53 and a first free end 56 of the second cable 34 may be selectively manually anchored to the chassis 14 at a lower right-hand anchor point location 55. For this purpose, a first retaining pin 62 is mounted through the closed loop socket 60 at the first free end 52 of the first cable 32 and through suitable apertures in a left-hand clevis 64 provided on the axle housing 24, while a second retaining pin 66 is mounted through the closed loop socket 60 at the first free end 56 of the second cable 34 and through suitable apertures in a right-hand clevis 68 on the axis housing 24. The socket 60 at the second free end 54 of the first cable 32 is coupled by means of a shackle 70 to the outwardly extending arm 44 of the first bell crank 38 to provide a second or upper left-hand anchor point location 57 for the first cable 32. The socket 60 at the second free end 58 of the second cable 34 is similarly coupled by means of a shackle 72 to the outwardly extending arm 44 of the second bell crank 40 to provide a second or right-hand anchor point location 59 for the second cable 34.

In the present embodiment, the load distribution mechanism 36 further includes a third tension member or steel wire cable 74 with each of its opposite ends 76,78 provided with a pin clevis 80. One of the ends 76 is connected by a pin 82 to the upwardly extending arm 46 of the first bell crank 38 and the other end 78 is connected to the upwardly extending arm 46 of the second bell crank 40 by a pin 84. The first and second tension members or cables 32,34 are of a first designed tensile carrying capacity and the third tension member or cable 74 is of a second designed tensile carrying capacity which is a predetermined amount below the first designed tensile carrying capacity of the first and second tension members 32,34. This feature acts as a fuse to ensure that if an overload force is applied to the mooring device 30, the third cable 74 will break first, providing the operator with an audible or other warning of the failure to the mooring device 30. In particular, the third cable 74 has been made of a steel wire rope having 31.75 mm (1.25") diameter having a tensile capacity of 711 kN (79.9 tons). Thus, the third cable has a smaller diameter and tensile capacity than the first and second cables 32,34.

Figure 5:
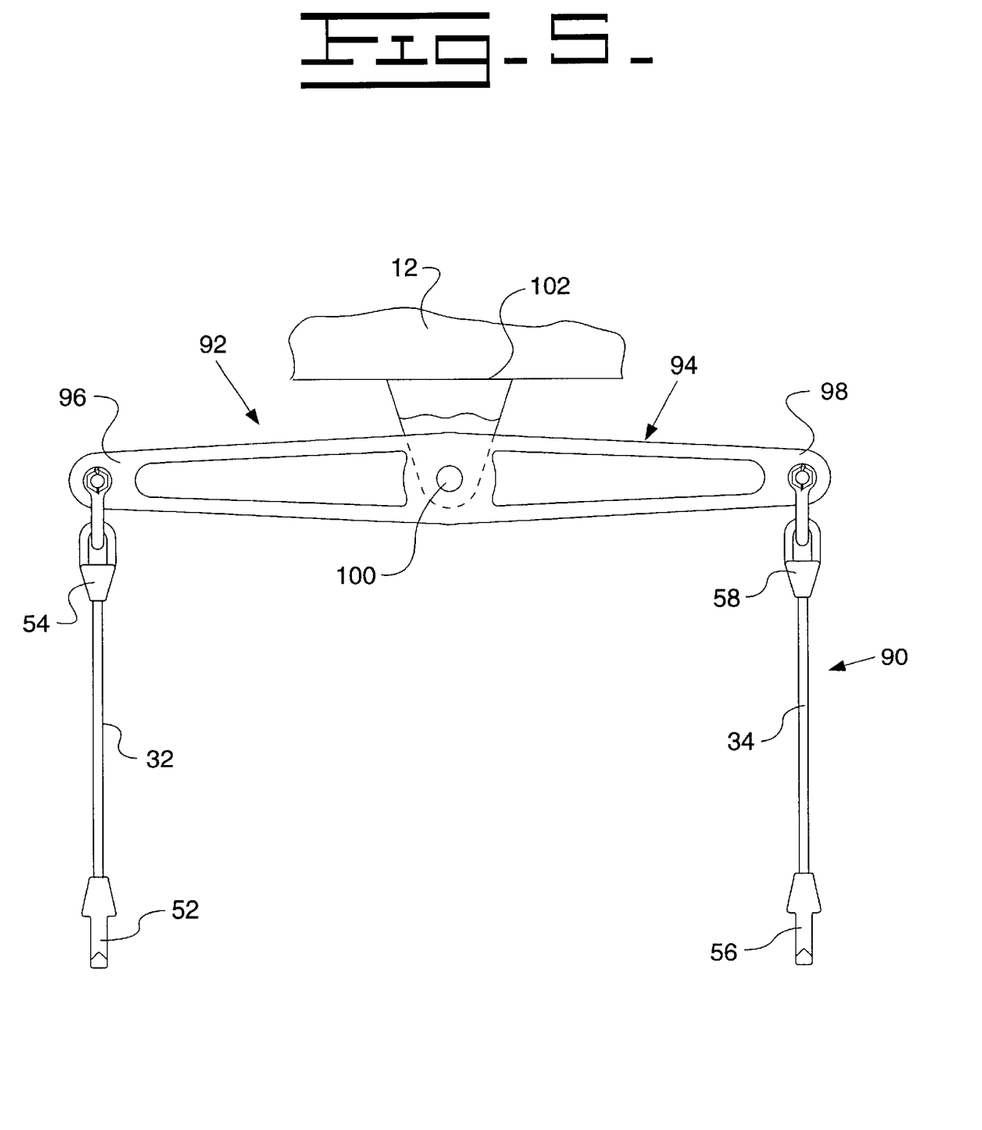
FIG. 5 is an elevational view similar to FIG. 4, but illustrating an alternate embodiment of the mooring device.

In a second embodiment of the present invention, a mooring device 90 includes a load distribution mechanism 92 having an elongated equalizer or teeter bar 94. Such equalizer bar 94 has a pair of opposite ends 96,98 and a central pivot point 100. A pivot bracket 102 is carried on the dump body 12 for pivotally mounting the equalizer bar 94 at the central pivot point 100 to the dump body 12. In this embodiment, the second free ends 54,58 of each of the first and second cables 32,34 of the previous embodiment are pivotally shackled to a respective one of the opposite ends 96,98 of the equalizer bar 94.

Figure 6:
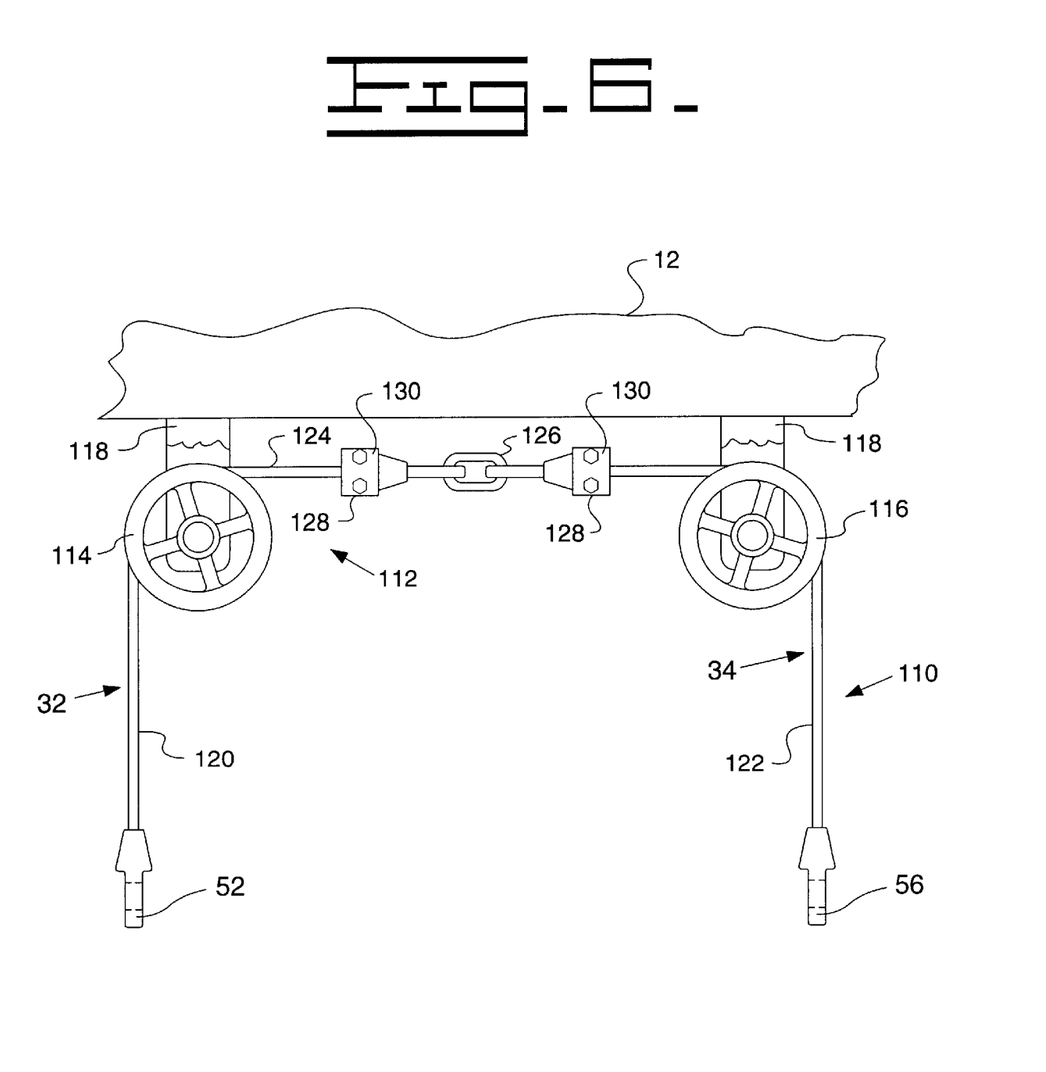
FIG. 6 is an elevational view similar to FIG. 4, but illustrating another alternate embodiment of the mooring device.

In a third embodiment of the present invention, a mooring device 110 has a load distribution mechanism 112 that includes a first pulley wheel 114 and a second pulley wheel 116. Both of the pulley wheels 114,116 are rotatably carried by brackets 118 on the dump body 12 behind the pivot axis 16 of the body 12 in a laterally spaced relationship to each other. The first tension member 32 includes a first steel wire cable segment 120 entrained about the first pulley wheel 114 and the second tension member 34 includes a second steel wire cable segment 122 entrained about the second pulley wheel 116. A third steel wire cable segment 124 joins the first and second steel wire cable segments 120,122 together between the first and second pulley wheels 114,116. The load distribution mechanism 112 also preferably includes a fuse device 126 between the pulley wheels 114,116 and at least one stop device 128. The fuse device 126 may be in the form of providing the third cable segment 124 with a smaller diameter, less tensile capacity than that the first and second cable segments 120,122 so as to break at a lower tensile load than either of the first and second cable segments 120,122. The stop device 128 is adapted to prevent the release of at least one of the first and second cable segments 120,122 through a respective one of the pulleys 114,116. Such stop device 128 may be a block 130 clapped about the first or second cable segments 120,122. Preferable, two stop devices 128 are employed for this purpose.

INDUSTRIAL APPLICABILITY

The mooring device 30 constructed in accordance with the present invention is effective in holding a dump body 12 of a large off-highway truck 10 in its raised position when the truck is being worked on in order to afford workers greater access to various components of the truck 10 during repairs, service or other maintenance of the truck. The large diameter cables in prior devices are so stiff that it is extremely difficult if not impossible for one person to hook up the cable to its moorings, particularly if the cable became bent or twisted over time. In prior devices that employed two smaller cables in place of one large cable, it was possible to have the entire load carried by only one of such cables because of varying or unequal distances between the cables' anchor points. This can be cause by the truck setting on uneven ground or because of a twisting of the dump body or the like. The advantage of the present invention is that the load distribution mechanism 36, 92, or 112 is effective in permitting the use of smaller diameter tension cables 32,34 so that a worker can more easily hook up such cables when the dump body is to be restrained in the raised position, while accommodating the magnitude of changes or deviations in the distances that may occur between the anchor points of such cables so as to ensure that both cables are equally loaded. It is also important to note that each of the cables 32,34 is preferably located in a generally tangential relationship and in a plane that is perpendicular to the pivot axis 16 of the dump body 12 to minimize the exertion of resultant forces on the cables 32,34.

To effect the use of the mooring device 30, the dump body 12 is raised to its fully raised position. In such fully raised position, the first end 52 of the first cable 32 is attached its mooring point, i.e., to the left-hand clevis 64, by the insertion of the first retaining pin 62. Then, first end 56 of the second cable 34 is similarly attached to its mooring point, i.e., the right-hand clevis 68, by the insertion of the second retaining pin 66. It should be noted that the cables 32, 34 are of a length that is slightly greater than the distance between their anchor points when the dump body is in its fully raised position so that the cables are not taut in order to make the insertion of the retaining pins 62, 66 easier. With the first and second cables 32,34 so attached, the dump body is lowered slightly by a few degrees to make the cables 32, 34 taut. As the weight of the dump body 12 becomes restrained by the mooring device, the load distribution mechanisms 36, 92, or 112 of the present invention are each effective in ensuring that the weight of the dump body is equally distributed to and carried by both cables 32, 34, even though the distance between the anchor points of the cables may vary. As explained earlier, this variance may occur in the event that the truck 10 is setting on uneven ground, such as when one set of the dual tires 20 is setting in a hole for instance, or if the dump body 12 becomes twisted in use. The load distribution mechanism 36 of the first embodiment and the load distribution mechanism 112 of the third embodiment also include a fuse feature that ensures that an overload will not result in the failure of the first and second cables 32,34, but in the third cable 74 of load distribution mechanism 36 or the fuse device 126 of load distribution mechanism 112.

Other aspects and advantages of the present invention of this invention can be obtained through a study of the drawings, the disclosure and the appended claims.

What is claimed is:

1. A mooring device for maintaining a dump body of a truck in a raised position, said truck having a chassis with said dump body being pivotally mounted on said chassis about a transverse pivot axis for movement between a lowered position and a raised position, said mooring device comprising:
    a pair of laterally spaced apart and generally parallel tension members, each tension member being attached between one of a first set of mooring points on said chassis and one of a second set of mooring points on said dump body and each tension member being capable of carrying a high tensile load sufficient to maintain said dump body in its raised position; and
    a load distribution mechanism containing one of said first and second sets of mooring points, said load distribution mechanism being constructed with a capacity to accommodate a sufficient amount of dimensional variation to ensure that the tension members are equally loaded when said mooring device is being employed so as to prevent one of said tension members from carrying a substantially greater tensile load than the other tension member.

2. The mooring device of claim 1 wherein said amount of dimensional variation capacity is greater than 25.4 mm (1") and wherein said load distribution mechanism is affixed to said dump body and one of tension members has a first free end anchored to said chassis at a left-hand location and the other of said tension members has a first free end anchored to said chassis at a right-hand location.

3. The mooring device of claim 2 wherein said load distribution mechanism includes:
    a first bell crank and a second bell crank, each bell crank having an apex, a generally laterally outwardly extending arm and a generally upwardly extending arm; and
    a pair of brackets pivotally mounting a respective one of said bellcranks at their apexes to the underside of said dump body at transversely spaced apart right- and left-hand locations and at a preselected longitudinal distance to the rear of said pivot axis of said truck body.

4. The mooring device of claim 3 wherein said left-hand tension member has a second free end coupled to said outwardly extending arm of said first bell crank and said right-hand tension member has a second free end coupled to said outwardly extending arm of said second bell crank, and wherein said load distribution mechanism includes a third tension member having opposite ends, one of said opposite ends being connected to the upwardly extending arm of said first bell crank and the other end being connected to the upwardly extending arm of said second bell crank.

5. The mooring device of claim 4 wherein said right-hand and left-hand tension members are of a first designed tensile carrying capacity and said third tension member is of a second designed tensile carrying capacity which is a predetermined amount below said first designed tensile carrying capacity of said right- and left-hand tension members.

6. The mooring device of claim 5 wherein each of said tension members is constructed from steel wire cable.

7. The mooring device of claim 5 wherein each of said tension members is constructed from steel chain.

8. The mooring device of claim 5 wherein each of said tension members is constructed from a steel rod.

9. The mooring device of claim 2 wherein said load distribution mechanism includes:
    an elongated equalizer bar having a pair of opposite ends and a central pivot point;
    a pivot bracket carried on said dump body for pivotally mounting said equalizer bar at said central pivot point to said dump body; and
    said tension members each include a free end, each of said free ends being coupled to a respective one of the opposite ends of said equalizer bar.

10. The mooring device of claim 2 wherein said load distribution mechanism includes:
    a first pulley wheel and a second pulley wheel, both of said pulley wheels being rotatably carried on said dump body behind said pivot axis of said body in a laterally spaced relationship to each other;
    said right-hand tension member includes a first steel wire cable segment entrained about said first pulley wheel; and
    said left-hand tension member includes a second steel wire cable segment entrained about said second pulley wheel.

11. The mooring device of claim 10 including a third steel wire cable segment joining said first and second steel wire cable segments together between said first and second pulley wheels and wherein said load distribution mechanism includes a fuse device between said pulley wheels and at least one stop device, said fuse device being adapted to break at a lower tensile load than either of said first and second cable segments and said stop device being adapted to prevent the release of at least one of said first and second cable segments through a respective one of said pulleys.

12. A mooring device for maintaining a dump body of a truck in a raised position, said truck having a chassis with said dump body being pivotally mounted on said chassis about a transverse pivot axis for movement between a lowered position and a raised position, said mooring device comprising:
- a first tension member capable of carrying a high tensile load and having a first free end anchored to said chassis at a left-hand location;
- a second tension member capable of carrying a high tensile load and having a first free end anchored to said chassis at a right hand location spaced laterally apart from said left-hand location; and
- a load distribution mechanism affixed to said dump body, said load distribution mechanism being adapted to ensure that equal tensile loads are carried by each of said first and second tension members when said mooring device is being employed to maintain said dump body in its raised position so as to prevent one of said tension members from carrying a substantially greater tensile load than the other member.

13. A mooring device for maintaining a dump body of a truck in a raised position, said truck having a chassis with a rear axle housing, said dump body being pivotally mounted on said chassis about a transverse pivot axis for movement between a lowered position and a raised position, said mooring device comprising:
- a first bell crank and a second bell crank, each bell crank having an apex;
- a pair of brackets attached to the underside of said dump body at transversely spaced apart locations to the rear of said dump body pivot axis, each of said brackets being adapted to pivotally mount a respective one of said bellcranks at their apexes about a pivot axis that is parallel to the pivot axis of the other bellcrank;
- a first cable having one end connected to said axle housing and a second end connected to a first lever arm of said first bell crank, said lever arm being oriented in a lateral, outwardly extending direction;
- a second cable having one end connected to said axle housing and a second end connected to a first lever arm of said second bell crank, said first lever arm of said second bell crank being oriented in a lateral, outwardly extending direction; and
- a third cable interconnected between an upwardly extending lever arm of each of said first and second bell cranks whereby a tensile load on said mooring device is shared equally by said first and second cables.

14. The mooring device of claim 13 wherein said first and second cables have a first designed tensile carrying capacity and said third cable has a second designed tensile carrying capacity which is a predetermined amount below said first designed tensile carrying capacity of said first and second cables.

* * * * *

UNITED STATES PATENT AND TRADEMARK OFFICE
CERTIFICATE OF CORRECTION

PATENT NO. : 6,471,299 B2
DATED : October 29, 2002
INVENTOR(S) : Thomas N. Brooks, Jr. et al.

It is certified that error appears in the above-identified patent and that said Letters Patent is hereby corrected as shown below:

<u>Title page,</u>
Item [56], the following patents should be removed:
"US   3,988,925
US   4,483,185
US   4,521,863
US   4,966,107
US   4,981,117
US   5,003,940
US   5,351,413
DE   30 02 015
EP   0 407 302
GB   423313
JP   56077505
JP   59007716
JP   60027707
JP   60069223"

Signed and Sealed this

First Day of April, 2003

JAMES E. ROGAN
*Director of the United States Patent and Trademark Office*